Feb. 18, 1964
C. B. HANING
3,121,408
COLLAPSIBLE BURNER
Filed March 27, 1961
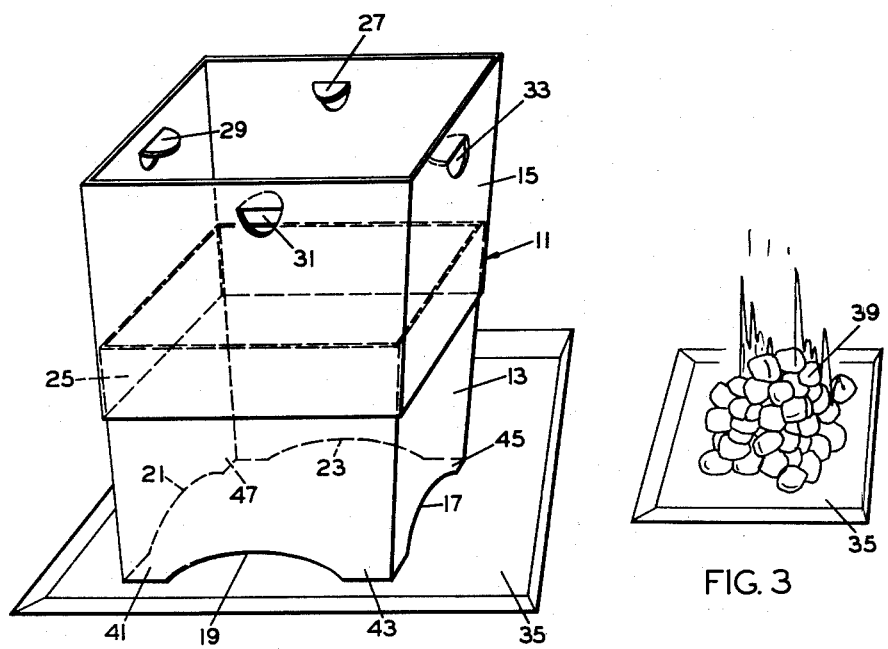
FIG. 1
FIG. 3
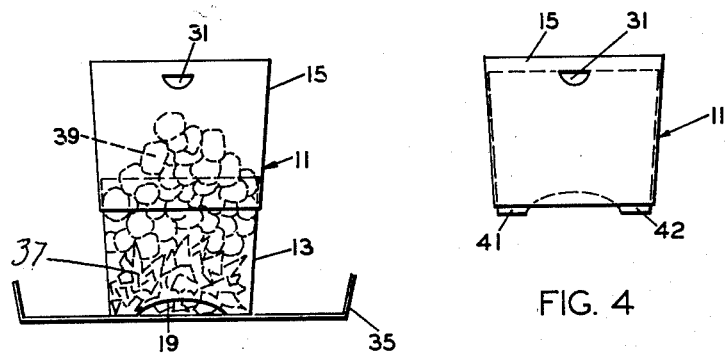
FIG. 2
FIG. 4
INVENTOR.
CHARLES BRUCE HANING
BY
Jerome R. Cox
ATTORNEY

United States Patent Office 3,121,408
Patented Feb. 18, 1964

3,121,408
COLLAPSIBLE BURNER
Charles Bruce Haning, 722 Lancreo, Lancaster, Ohio
Filed Mar. 27, 1961, Ser. No. 98,402
4 Claims. (Cl. 110—1)

The invention disclosed and claimed in this application relates to burners and especially to a quick start chimney for charcoal grills. The embodiment illustrating the invention shows such a charcoal lighter. The invention provides a simple, yet very effective way of starting fires in a charcoal grill such as are often used in backyards, picnic grounds, etc.

Prior hereto various ways have been proposed for the lighting of charcoal. The usual way is to put the charcoal on the grill and add a quantity of some readily burnable liquid such as lighter fluid, and then light the fluid which, after a time, ignites the charcoal. It has also been proposed to light such charcoal by means of a chimney which is set upon a grill. However, chimneys which have been heretofore proposed are bulky and difficult to store, and as a consequence have not gone into extensive use. The patent to Phelps 2,920,164 shows a chimney which is for the purpose of igniting charcoal by means of paper placed beneath the charcoal, the chimney apparently being made of metal. The patent is directed to the same general problem that applicant here has in mind. However, the chimney is not tapered and is not telescopic. The patent to Rymer 2,939,773 relates to a charcoal lighter in which the charcoal is put into a pan and ignited over a gas or coal fire and then carried outdoors to a charcoal grill where the ignited charcoal is dumped into the barbecue grill and additional unlighted charcoal is added thereto. None of the prior art patents relating to charcoal lighters appear, so far as we are aware, to have provisions so that the chimney may be reduced in size as by telescoping the parts thereof so that it is convenient to store or to use as desired.

One of the objects of the invention is to provide a simple, effective means for starting a fire upon an open air grill.

A further object of the invention is the provision of a chimney which can be placed upon a grill and which will enable the operator to start a fire quickly and which may then be removed and telescoped together for easy storage.

A further object of my invention is the provision of a quick start chimney for charcoal grills which is collapsible and easily stored.

Further objects and features of the invention will be apparent from the following specification and claims when considered in connection with the accompanying drawings.

The drawings illustrate one embodiment of my invention and its operation.

In the drawings:

FIG. 1 is a view in perspective (with hidden parts shown in dotted line) showing an embodiment of my invention positioned upon an outdoor charcoal grill and extended so it is ready for the addition of igniting material and charcoal and usable as a lighter for charcoal placed upon the grill;

FIG. 2 is a view of the lighter shown in FIG. 1 placed upon a grill in front elevation with hidden contents shown in dotted lines and showing paper placed in the bottom of the chimney and charcoal placed over the paper to fill the chimney so that the charcoal may be easily ignited, the chimney being in its extended position as in FIG. 1.

FIG. 3 is a view in perspective of a grill having the charcoal ignited by my lighter and having the lighter removed so that the charcoal is burning freely; and FIG. 4 is a view of the charcoal lighter of FIGS. 1 and 2 shown in its compact position when it has been telescoped for easy storing.

Referring now to the drawings for a more detailed description of the invention, it may be seen that I have shown in FIG. 1 a charcoal lighter chimney designated 11 comprising a lower section 13 and an upper section 15. Both of these sections are formed of sheet metal as shown and are tapered from the top to the bottom and the upper section is slightly longer and wider than the lower section so that the lower section may telescope therein and be designated an inner member and so that the upper section may be designated an outer member and form an extension of the lower section when the parts are extended. Both are rectangular box-shaped telescoping parts. Each is an open ended funnel-shaped member tapering from the top to the bottom and having a larger opening at the top and a smaller opening at the bottom. The bottom opening of the upper section 15 is smaller than the outer periphery of the top of the section 13 so that the member may not be disassociated by raising the outer member above the inner member. The lower section 13 is formed with cutout openings 17 and 19, 21 and 23. The upper portion 25 of the lower section 13 is, as shown, positioned within the upper section 15 even when the parts are extended. The upper section 15 is formed with indentations 27, 29, 31 and 33. These indentations are hemispherical and the portion of the sheet metal sides which are severed are turned or bent inward so as to form tabs or ridges which support the upper section on the lower section when the parts are telescoped. Thereby the parts are prevented from being inadvertently disassembled by raising the inner members above the outer members. These inwardly bent tabs are provided for each pair of opposed parallel sides of the outer member 15 and are each aligned with the indentation and tab of the opposed parallel side. As shown, my lighter 11 may be placed upon a grill such as the grill 35.

The sections 13 and 15 are formed of sheet metal as shown but may be formed of any suitable material. I prefer to use sheet metal or plastic. The hemispherical openings formed by the indentations 27, 29, 31 and 33 form a convenient means by which the lighter may be removed from the grill. A poker or other implement or a stick of wood may be inserted through two opposite holes and the lighter chimney as a whole may be thus lifted off, even though hot, without danger of burning the operator's hands. Although only two portions 13 and 15 of the lighter 11 are shown three or more tapering telescoping sections may be provided if desired. The openings 17, 19, 21 and 23 are cut out portions at the lower edges of each of the four sides of the inner member 13 and provide adequate draft for burning the paper, igniting the charcoal and burning the charcoal, although igniting the charcoal is difficult otherwise. When stored, the tabs 27, 29, 31 and 33 prevent the telescoping parts from being separated. Each of the portions as shown is a hollow frustum of a four-sided pyramid. I prefer to form my lighter in this shape. It could, however, be a hollow frustum of a cone or of a tapering elliptical container. Obviously, both the top and bottom of the lighter 11 are completely open.

In the operation of my invention the lighter chimney 11 is placed on a grill such as for example the substantially flat grill 35 and is supported by said grill and then, paper such as the paper 37 is placed in the bottom part of the chimney, charcoal such as the charcoal 39 is then piled upon the paper up to nearly the top of the chimney if desired whereby the chimney contains the charcoal which is lighted and burned. Preferably an adequate supply of charcoal should be added. The charcoal is also supported by the grill. The paper is then lighted through one of the openings such as, for example, the opening 19 and the charcoal is soon ignited by the draft created. Thereafter the lighter 11 is as indicated in FIG. 3, removed from the grill 35 and the charcoal 39 continues to burn. The lighter 11 is then telescoped so that the portion 13 is covered by the portion 15 except for the feet 41, 43, 45 and 47, which may, if desired, extend down.

It is to be understood that the above described embodiment of my invention is for the purpose of illustration only and various changes may be made therein without departing from the spirit and scope of the invention.

I claim:

1. A charcoal lighter consisting of a sheet metal chimney comprising
    an inner open ended funnel shaped sheet metal member tapering from the top to the bottom, having one opening at the top and having a smaller opening at the bottom; and
    an outer open ended funnel shaped sheet metal member tapering from the top to the bottom telescoped over the inner member having one opening at the top and having an opening at the bottom smaller than the opening at the top thereof and also smaller than the outer periphery of the top of the inner member whereby the members may not be disassembled by raising the outer member above the inner member; and
    the outer member having a plurality of inwardly bent tabs whereby the parts are prevented from being inadvertently disassembled by raising the inner member above the outer member.

2. The structure of claim 1 in which the inner and outer members are substantially rectangular box shaped telescoping parts.

3. The structure of claim 1 in which the tabs are integral parts of the sides of the outer sheet metal members bent inward to form openings through which a tool may be inserted so that the chimney as a whole may be lifted.

4. A charcoal burner and lighter for charcoal to be burned for use in combination with a substantially flat grill; comprising a lighter chimney supported by said grill and for containing the charcoal which is to be lighted and burned, the charcoal being also supported by said grill; the lighter chimney comprising a plurality of telescoping parts of which each part is a tapering hollow member having an opening at the top larger than the opening at the bottom and contacts at least one of the other members; in which for each contacting pair of tapering members, the lower opening of the outer member is smaller than the outer periphery at the top of the inner member; in which the tapering hollow members consist of a pair of hollow frustums of four sided pyramids; in which the inner member has cut out portions at the lower edges of each of the four sides by which a draft is created; and in which each pair of opposed parallel sides of the outer member is formed with aligned inwardly bent tabs by which the members are prevented from being inadvertently disassembled by raising the inner member above the outer members and wherein the aligned inwardly bent tabs form aligned openings through which a tool may be inserted so that the lighter chimney as a whole may be lifted.

References Cited in the file of this patent

UNITED STATES PATENTS

| | | |
|---|---|---|
| 859,030 | Walker et al. | July 2, 1907 |
| 915,239 | Stapp | Mar. 16, 1909 |
| 1,938,645 | Swartz et al. | Dec. 12, 1933 |
| 1,954,542 | Scheu | Apr. 10, 1934 |
| 2,120,683 | Simmons | June 14, 1938 |
| 2,154,165 | Huntington | Apr. 11, 1939 |
| 2,763,395 | Meek | Sept. 18, 1956 |